US012783678B2

(12) United States Patent
Reddy et al.

(10) Patent No.: US 12,783,678 B2
(45) Date of Patent: Nov. 3, 2026

(54) INTER-MUTUAL VALIDATION BY ROOT OF TRUSTS

(71) Applicant: Hewlett Packard Enterprise Development LP, Spring, TX (US)

(72) Inventors: Dilip Kumar Ramakrishna Reddy, Bangalore (IN); Shiva R. Dasari, Houston, TX (US); Kenneth John Geer, Aurburn, CA (US); Stephen Barnett Lyle, Granite Ba, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 99 days.

(21) Appl. No.: 18/764,461

(22) Filed: Jul. 5, 2024

(65) Prior Publication Data

US 2025/0356018 A1 Nov. 20, 2025

(30) Foreign Application Priority Data

May 15, 2024 (IN) ............................ 202441038195

(51) Int. Cl.
*G06F 21/57* (2013.01)
*G06F 21/60* (2013.01)

(52) U.S. Cl.
CPC .......... *G06F 21/572* (2013.01); *G06F 21/604* (2013.01)

(58) Field of Classification Search
CPC ........ G06F 21/00; G06F 21/57; G06F 21/572; G06F 21/604; G06F 21/575; G06F 21/64; G06F 12/1433; G06F 21/44
USPC .......................................................... 713/169
See application file for complete search history.

(56) References Cited

U.S. PATENT DOCUMENTS

| | | | | |
|---|---|---|---|---|
| 6,625,729 | B1 * | 9/2003 | Angelo | G06F 12/1433 711/E12.1 |
| 9,792,440 | B1 * | 10/2017 | Wang | H04L 63/1466 |
| 10,740,468 | B2 | 8/2020 | Shivanna et al. | |
| 12,299,129 | B2 * | 5/2025 | Terpstra | G06F 21/57 |
| 12,411,938 | B1 * | 9/2025 | Gathani | G06F 21/34 |
| 2005/0257073 | A1 * | 11/2005 | Bade | G06F 21/575 713/193 |

(Continued)

FOREIGN PATENT DOCUMENTS

KR 20150103376 A * 9/2015 ............. G06F 21/57

OTHER PUBLICATIONS

Black Hat, "Breaking Samsung's Root of Trust: Exploiting Samsung S10 S-Boot", 2020, 77 Pages.

(Continued)

*Primary Examiner* — Catherine Thiaw
*Assistant Examiner* — Amir Mahdi Hajiabbasi
(74) *Attorney, Agent, or Firm* — Trop, Pruner & Hu, P.C.

(57) ABSTRACT

In some examples, a system includes a plurality of subsystems associated with respective root of trusts (RoTs). The RoTs include a first RoT to validate information of a first subsystem of the plurality of subsystems, and a second RoT to validate information of a second subsystem of the plurality of subsystems. The RoTs further perform inter-mutual validation that includes the first RoT validating the information of the second subsystem, based on the first RoT validating the second subsystem, providing, by the first RoT, an indication of successful validation of the second subsystem, and based on the indication, the second RoT validating the information of the first subsystem.

20 Claims, 5 Drawing Sheets

(56) References Cited

U.S. PATENT DOCUMENTS

| | | | | |
|---|---|---|---|---|
| 2005/0278499 | A1* | 12/2005 | Durham | G06F 12/1433 711/E12.1 |
| 2013/0227281 | A1* | 8/2013 | Kounga | G06F 21/6209 713/165 |
| 2018/0091315 | A1* | 3/2018 | Singhal | G06F 12/0238 |
| 2018/0181759 | A1* | 6/2018 | Smith | H04L 9/3247 |
| 2020/0310662 | A1* | 10/2020 | Staab | G06F 21/44 |
| 2021/0014068 | A1* | 1/2021 | Sandler | G06F 21/71 |
| 2021/0211451 | A1* | 7/2021 | Alsharif | H04L 63/12 |
| 2021/0232688 | A1* | 7/2021 | Luciani | G06F 21/121 |
| 2022/0027157 | A1* | 1/2022 | York | G06F 21/57 |
| 2022/0405391 | A1* | 12/2022 | Liu | G06F 21/44 |
| 2024/0070284 | A1* | 2/2024 | Orlando | G06F 21/575 |
| 2025/0097019 | A1* | 3/2025 | Ragavan | G06F 21/57 |

OTHER PUBLICATIONS

Jessie Frazelle, "Securing the Boot Process", Dec. 2019, 17 pages.
DMTF, Document Identifier: DSP0274, Version 1.0.1, Security Protocol and Data Model (SPDM) Specification, Mar. 19, 2021 (61 pages).

* cited by examiner

INTER-MUTUAL VALIDATION BY ROOT OF TRUSTS

BACKGROUND

A computing system can execute machine-readable instructions, including software and firmware. Software can include an operating system (OS) and application programs, for example. Firmware can include Basic Input/Output System (BIOS) code, Universal Extensible Firmware Interface (UEFI) code, or other firmware executed on a central processing unit (CPU) of an electronic device. Other software or firmware may execute on other processing devices of an electronic device, such as a microcontroller, a programmable integrated circuit, a programmable gate array, or another hardware processing circuit.

BRIEF DESCRIPTION OF THE DRAWINGS

Some implementations of the present disclosure are described with respect to the following figures.

Figure 1:
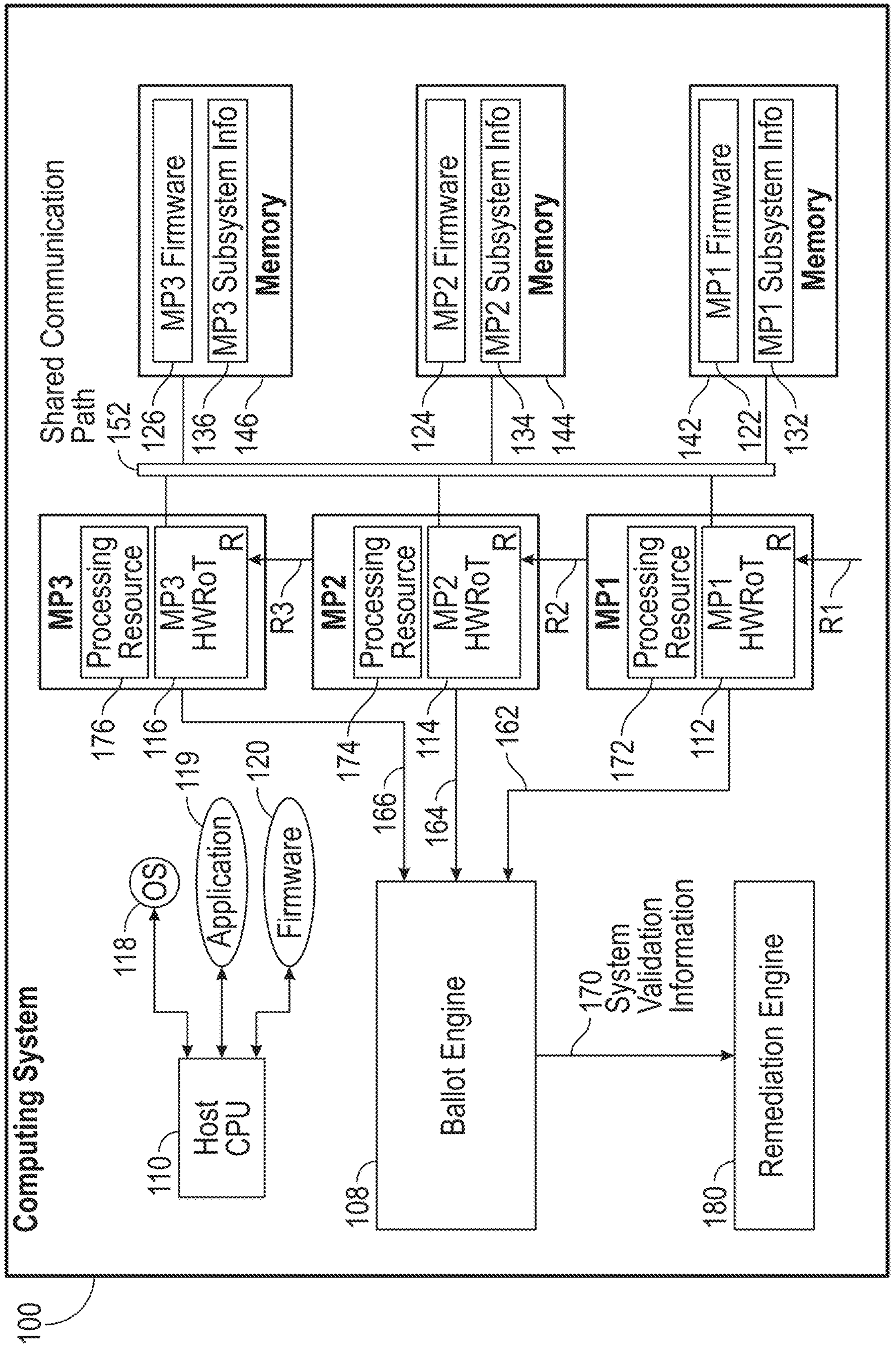
FIG. 1 is a block diagram of an arrangement including multiple root of trusts (ROTs), a ballot engine, and subsystems associated with the ROTs, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A computing system may include various subsystems, where a "subsystem" can refer to a processing assembly within the computing system for performing respective functionalities. Some of the functionalities of subsystem may be performed by machine-readable instructions (e.g., firmware or software) executed by the subsystem.

Subsystems in a computing system may be compromised by attackers, such as malware, human hackers, or other entities. For example, machine-readable instructions executed by a subsystem may be modified or replaced by an attacker, which leads to the execution of compromised machine-readable instructions by the subsystem. The compromised machine-readable instructions may perform unauthorized activities in the computing system, such as accessing sensitive information, causing the computing system to perform malicious actions, corrupting data or causing errors in the computing system, or other activities.

A trust mechanism may be implemented in a subsystem to establish trust of the subsystem. An example of such a trust mechanism is a Hardware Root of Trust (HWRoT), which is also referred to as a Silicon Root of Trust (SRoT). This type of trust mechanism is an example of a hardware-based trust mechanism that is used to validate information (e.g., machine-readable instructions, configuration information, security information, or other information) of a subsystem prior to execution of the subsystem. For example, when the computing system initially starts (such as due to powering on from a lower power or off state, a reboot, a reset, etc.), the HWRoT in the subsystem performs a measurement of the information of the subsystem, and uses a value (e.g., a hash value) produced by the measurement to perform a validation of the information of the subsystem. In some cases, the HWRoT in a first subsystem can validate information of one or more other subsystems.

A HWRoT itself may be subject to attack. Since a HWRoT is implicitly trusted as secure, an attack of the HWRoT may not be detected. As a result, a compromised HWRoT can lead to at least some portion of the computing system in which the HWRoT is located becoming vulnerable.

In accordance with some implementations of the present disclosure, a computing system includes multiple subsystems that include respective RoTs that are able to perform inter-mutual validation of one another. For example, the RoTs include a first RoT to validate information of a first subsystem, and a second RoT to validate information of a second subsystem. There may be more than two RoTs in further examples. The multiple RoTs are able to perform inter-mutual validation in which the RoTs of different subsystems are able to mutually validate other subsystems. For example, the inter-mutual validation includes the first RoT validating the information of the second subsystem. Based on the first RoT validating the second subsystem, the first subsystem releases the second subsystem from reset. After the release of the second subsystem from reset, the second RoT validates the information of the first subsystem.

An example of a RoT is a HWRoT that is implemented using hardware processing circuitry, which can include a microcontroller, a programmable integrated circuit, a programmable gate array, or another hardware processing circuitry. In other examples, a RoT may also be implemented using machine-readable instructions executable by hardware processing circuitry. A RoT is an entity that is to validate information of a target subsystem.

In the ensuing discussion, reference is made to HWRoTs for respective subsystems of a computing system that are able to perform inter-mutual validation according to some implementations of the present disclosure. However, in other examples, other types of RoTs may be employed for performing inter-mutual validation.

FIG. 1 is a block diagram of a computing system 100 that includes subsystems and associated HWRoTs. Examples of the computing system 100 can include any or some combination of the following: a computer (e.g., a desktop computer, a server computer, or another computer), a communication node, a storage system, a vehicle, a household appliance, or other types of electronic devices. A "computing system" can include a collection of electronic devices, where a "collection" of items can refer to a single item or multiple items.

In the example of FIG. 1, the subsystems of the computing system 100 include a management processor MP1, a management processor MP2, and a management processor MP3. The management processors MP1, MP2, and MP3 are to perform respective management tasks, where management tasks performed by the management processors MP1, MP2, and MP3 can differ from one another. For example, the management processor MP1 includes a security processor, the management processor MP2 includes a baseboard management controller (BMC), and the management processor MP3 includes a system management controller that is different from the BMC. Although three management processors are shown in FIG. 1, a computer system may include a different quantity (e.g., two or more) of management processors in other examples.

In some examples, the security processor can perform power on tasks of the computing system 100, which includes tasks associated with providing power to components of the computing system 100. Additionally, the security processor can perform other tasks, such as intrusion detection to detect a physical intrusion of the computing system 100 (e.g., detect that a door of the computing system 100 has been opened, detect that a panel of the computing system 100 has been removed, or detect another type of intrusion). In some examples, the security processor may also include a real-time clock. The security processor may also provide other functions.

The BMC can perform various management tasks associated with the computing system. Examples of tasks of the BMC are discussed further below. In other examples, a different type of management controller can be employed that is different from a BMC.

The system management controller may be a management controller for multiple different chassis of the computing system 100. In other examples, the system management controller may be omitted. A "chassis" refers to a separate physical partition of the computing system, and each chassis can include respective electronic components. The system management controller can perform fault management for a chassis. Also, the system management controller may perform power on/off orchestration among the different chassis. In some examples, each chassis may include a respective BMC such that multiple BMCs may be present in the computing system 100. The system management controller is able to interact with each of the BMCs.

Although specific examples of subsystems are mentioned above, it is noted that in other examples, other types of subsystems may be associated with respective HWRoTs. Examples of other subsystems can include a host subsystem including a host CPU, a network interface controller (NIC) that performs communications over a network, a power manager that manages power in the computing system 100, or an enclosure manager that manages tasks associated with an enclosure of the computing system 100.

In the example of FIG. 1, the management processor MP1 includes an MP1 HWRoT 112, the management processor MP2 includes an MP2 HWRoT 114, and the management processor MP3 includes an MP3 HWRoT 116.

The HWRoTs 112, 114, and 116 are able to access information in memories 142, 144, and 146 over a shared communication path 152. The shared communication path 152 may include one or more buses. Examples of buses can include any or some combination of the following: a Serial Peripheral Interface (SPI) bus, an Inter-Integrated Circuit (I2C) bus, or other types of communication links. In some examples, the shared communication path 152 may include multiplexers (implemented with hardware or machine-readable instructions) that are able to selectively connect a management processor to one or more of the memories 142, 144, and 146. More generally, the shared communication path 152 allows selective connection of different management processors to respective memories, which enables inter-mutual validation according to some implementations of the present disclosure.

A "memory" can be implemented using one or more memory devices, including any or some combination of the following: a dynamic random access memory (DRAM) device, a static random access memory (SRAM) device, a flash memory device, or another type of memory device. The multiple memories 142, 144, and 146 may be implemented with different memory devices (or different collections of memory devices), or the multiple memories 142, 144, and 146 may be implemented with different regions of a common memory device (or common collection of memory devices).

The memory 142 is associated with the management processor MP1, i.e., the memory 142 contains information (e.g., the MP1 firmware 122 and the MP1 subsystem information 132) that is to be used by the management processor MP1. Similarly, the memory 144 is associated with the management processor MP2, i.e., the memory 144 contains information (e.g., the MP2 firmware 124 and the MP2 subsystem information 134) that is to be used by the management processor MP2, and the memory 146 is associated with the management processor MP3, i.e., the memory 146 contains information (e.g., the MP3 firmware 126 and the MP3 subsystem information 136) that is to be used by the management processor MP3.

Each subsystem includes a processing resource to execute machine-readable instructions of the subsystem. A "processing resource" can refer to one or more hardware processing circuits, including microprocessors, cores of a multi-core microprocessor, programmable integrated circuits, programmable gate arrays, or other hardware processing circuits. For example, the management processor MP1 includes a processing resource 172, the management processor MP2 includes a processing resource 174, and the management processor MP3 includes a processing resource 176.

The processing resources 172, 174, and 176 are separate from a host CPU 110. The host CPU 110 includes one or more processors and is part of the processing resource of the computing system 100. A processor can include a microprocessor, a core of a multi-core microprocessor, a microcontroller, a programmable integrated circuit, a programmable gate array, or another hardware processing circuit. The host CPU 110 executes primary machine-readable instructions of the computing system 100, such as an OS 118, an application program 119, system firmware 120, or other software or firmware. The system firmware 120 can include BIOS code or UEFI code, for example. "Primary" machine-readable instructions are distinct (and separate) from machine-readable instructions (such as firmware or software) executable by other electronic components separate from the host CPU 110. Such other electronic components can include subsystems such as the management processors MP1, MP2, and MP3. The primary machine-readable instructions may be stored in a storage medium (not shown in FIG. 1)

The processing resource 172 in the management processor MP1 can execute machine-readable instructions of the management processor MP1. The machine-readable instructions of the management processor MP1 include MP1 firmware 122. Similarly, the processing resource 174 in the management processor MP2 can execute machine-readable instructions of the management processor MP2, including MP2 firmware 124. The processing resource 176 in the management processor MP3 can execute machine-readable instructions of the management processor MP3, including MP3 firmware 126. Other types of machine-readable instructions (such as software) can also be executed in a subsystem.

In addition to machine-readable instructions, a subsystem can also be associated with other subsystem information, including configuration information that defines a configuration of the subsystem, security information that pertains to how a subsystem implements security to protect the subsystem from unauthorized access, and other information.

For example, the management processor MP1 is associated with MP1 subsystem information 132 stored in the memory 142, the management processor MP2 is associated with MP2 subsystem information 134 stored in the memory 144, and the management processor MP3 is associated with MP3 subsystem information 136 stored in the memory 146. The MP1 subsystem information 132 may be loaded into the management processor MP1 to configure the management processor MP1 or to other affect an operation of the management processor MP1. Similarly, the MP2 subsystem information 134 may be loaded into the management processor MP2 to configure the management processor MP2 or to other affect an operation of the management processor MP2, and the MP3 subsystem information 136 may be loaded into the management processor MP3 to configure the management processor MP3 or to other affect an operation of the management processor MP3.

Although FIG. 1 shows the information of the respective management processors being stored in the memories 142, 144, and 146 that are external to the respective management processors, in other examples, at least a portion of the information of a given management processor may be stored in a memory that is inside the given management processor.

A HWRoT is able to access a memory associated with another subsystem over the shared communication path 152. In some examples, the shared communication path 152 can allow selective access of information in a memory associated with a subsystem by a HWRoT based on use of semaphores or locks. For example, the MP1 HWRoT 112 can acquire a semaphore to access the MP2 firmware 124 and the MP2 subsystem information 134 by acquiring a first semaphore. While the MP1 HWRoT 112 holds the first semaphore, another HWRoT would not have access of the MP2 firmware 124 and the MP2 subsystem information 134 in the memory 144.

The MP1 HWRoT 112 is able to self-validate the management processor MP1 by performing a measurement of information of the management processor MP1, including the MP1 firmware 122 and the MP1 subsystem information 132. In further examples, the measurement can also be of software and other information. Measuring information of a subsystem can include computing a value produced by applying a function to the information. The applied function can include a cryptographic hash function that produces a hash value.

The value generated by measuring the information of the subsystem can be compared by the HWRoT to a previously stored value. If the generated value matches the previously stored value, then that indicates that the information of the subsystem has not been modified, and thus can be trusted.

The MP2 HWRoT 114 similarly is able to self-validate the management processor MP2 by performing a measurement of information of the management processor MP2, including the MP2 firmware 124 and the MP2 subsystem information 134. Similarly, the MP3 HWRoT 116 is able to self-validate the management processor MP3 by performing a measurement of information of the management processor MP3, including the MP3 firmware 126 and the MP3 subsystem information 136.

In some examples, each HWRoT 112, 114, and 116 has a reset (R) input. A reset signal R1 is connected to the R input of the MP1 HWRoT 112, a reset signal R2 is connected to the R input of the MP2 HWRoT 114, and a reset signal R3 is connected to the R input of the MP3 HWRoT 116. If a reset signal to a reset input of a HWRoT is in an active state, then the HWRoT is maintained in a reset state in which the HWRoT does not execute. However, if the reset signal is in an inactive state, then the HWRoT is released from reset and the HWRoT can execute. An active state of a reset signal can refer to either a "1" or "0" state, and an inactive state of the reset signal can refer to either a "0" or "1" state.

In some examples, the HWRoTs 112, 114, and 116 can be released from reset in a reset release sequence, in which a first HWRoT is first released from reset, and then the first HWRoT releases a second HWRoT from reset, and then the second HWRoT releases a third HWRoT from reset. In other examples, two or more of the HWRoTs 112, 114, and 116 can be released from reset together. For example, a first HWRoT is first released from reset, and then the first HWRoT can release multiple other HWRoTs from reset. In yet further examples, all of the HWRoTs 112, 114, and 116 can be released from reset independently of one another.

In an example depicted in FIG. 1, the MP1 HWRoT 112 can be the first HWRoT to be released from reset. For example, a reset release chain can include first releasing the MP1 HWRoT 112 from reset, then releasing the MP2 HWRoT 114 from reset, then releasing the MP2 HWRoT 114 from reset. In other examples, a different reset release chain can be employed, or the HWRoTs 112, 114, and 116 may be released from reset independently.

The release of the HWRoTs 112, 114, and 116 from reset allows the HWRoTs 112, 114, and 116 to perform inter-mutual validation according to some implementations of the present disclosure.

In some examples, the HWRoTs 112, 114, and 116 provide respective validation results 162, 164, and 166 to a ballot engine 108. As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits. The ballot engine 108 may be separate from each of the HWRoTs 112, 114, and 116. Alternatively, the ballot engine 108 may be part of one of the HWRoTs 112, 114, and 116.

Based on the validation results 162, 164, and 166, the ballot engine 108 can determine which of the management processors MP1, MP2, and MP3, if any, is exhibiting any trust issues that may indicate the subsystem is compromised. In other examples, the ballot engine 108 may be omitted.

Figure 2A:
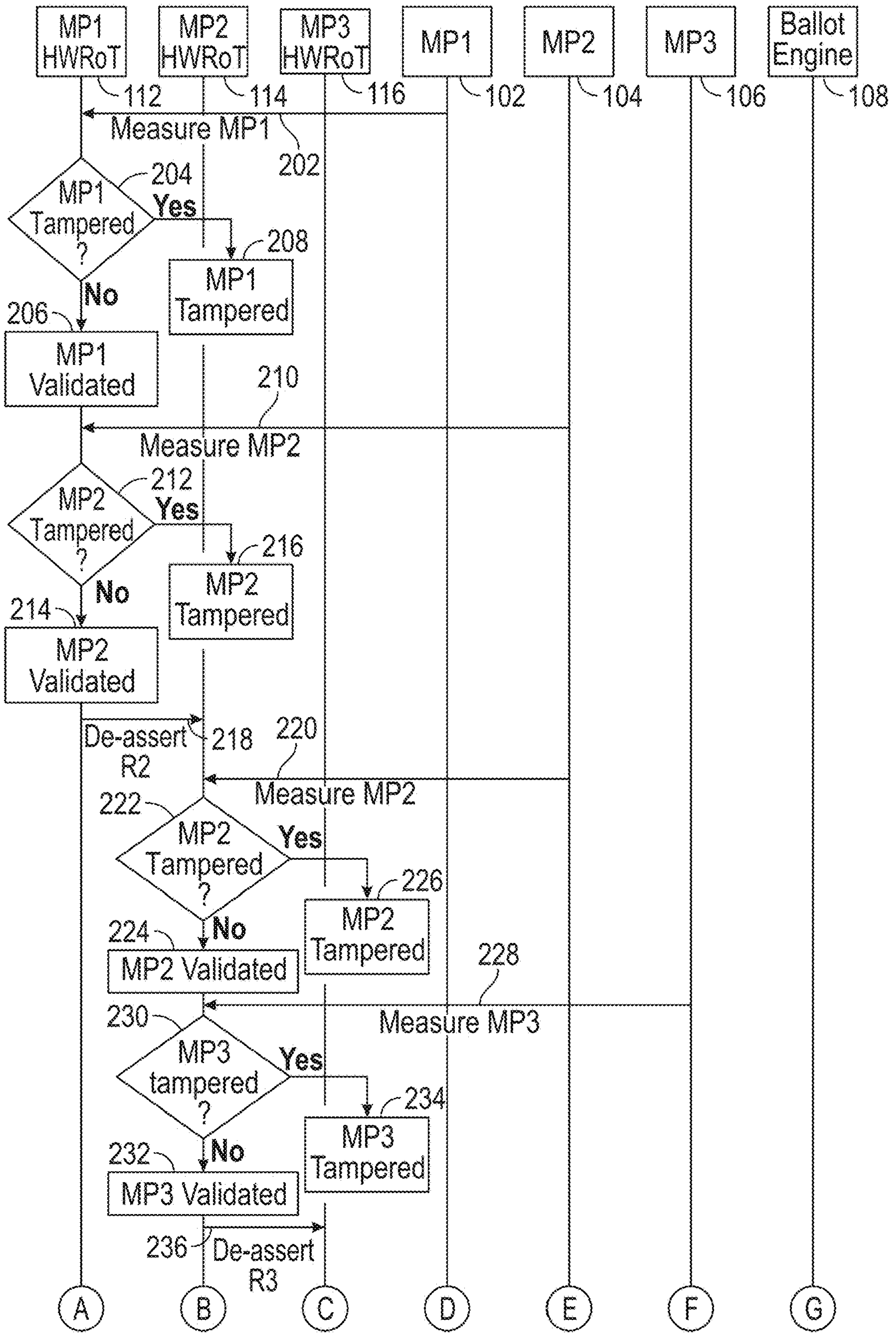
FIG. 2A to FIG. 2B show a flow diagram of an inter-mutual validation process performed by HWRoTs and a ballot engine, according to some examples.
Figure 2B:
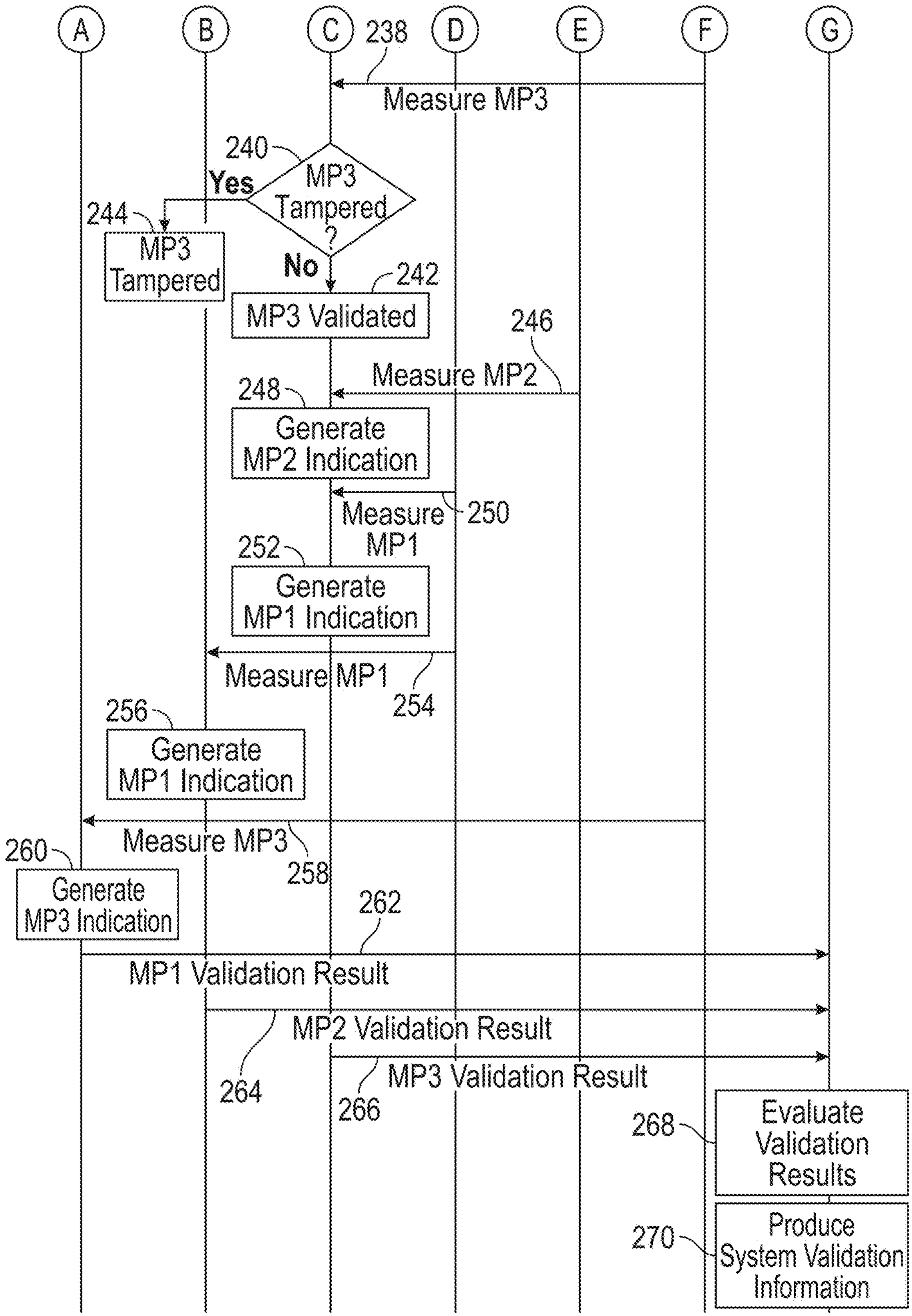

The following discussion refers to both FIG. 1 and FIG. 2A to FIG. 2B. FIGS. 2A-FIG. 2B show a flow diagram of an inter-mutual process according to some examples. Although FIGS. 2A-2B depict a specific order of tasks, in other examples, a different order of tasks can be performed.

The MP1 HWRoT 112 measures (at 202) information of the management processor MP1, including the MP1 firmware 122 and the MP1 subsystem information 132. The MP1 HWRoT 112 can read the MP1 firmware 122 and the MP1 subsystem information 132 from the memory 142, and the MP1 HWRoT 112 applies a function (e.g., a cryptographic hash function) to the information of the management processor MP1 to generate a value MP1_V1 (e.g., a hash value) based on the information of the management processor MP1. The HWRoT 112 determines (at 204) whether the information of the management processor MP1 has been tampered with based on the generated value MP1_V1 (this is part of the self-validation of the management processor MP1 by the MP1 HWRoT 112). In an example, the MP1 HWRoT 112 can compare the generated value MP1_V1 to a previously stored value MP1_Stored. The previously stored value MP1_Stored may have been generated by applying the function to a known good copy of the MP1 firmware 122 and the MP1 subsystem information 132. If the generated value MP1_V1 matches the previously stored value MP1_Stored, then that indicates the information of the management processor MP1 has not been tampered with, and thus the management processor MP1 can be trusted. In response, the MP1 HWRoT 112 produces (at 206) an MP1 validated indication (e.g., in the form of a signal, a message, an information element, or another indicator) to indicate that the management processor MP1 has been validated (i.e., has not been compromised).

However, if the generated value MP1_V1 does not match the previously stored value MP1_Stored, then that indicates the management processor MP1 has been tampered with, and the MP1 HWRoT 112 produces (at 208) an MP1 tampered indication that indicates that the management processor MP1 has been compromised.

In some examples, the MP1 HWRoT 112 may further measure (at 210) the information of the management processor MP2 (including the MP2 firmware 124 and the MP2 subsystem information 134) to validate the information of the management processor MP2. The validation of the information of the management processor MP2 can be based on comparing a value MP2_V1 generated from the information of the management processor MP2 to a previously stored value MP2_Stored for the management processor MP2. The previously stored value MP2_Stored may have been generated by applying the function to a known good copy of the MP2 firmware 124 and the MP2 subsystem information 134.

If the MP1 HWRoT 112 determines (at 212) that the information of the management processor MP2 has not been tampered based on the generated value MP2_V1 from the information of the management processor MP2 matching the previously stored value MP2_Stored, the MP1 HWRoT 112 produces (at 214) an MP2 validated indication that indicates that the management processor MP2 has not been compromised. However, if the MP1 HWRoT 112 determines (at 212) that the information of the management processor MP2 has been tampered with based on the generated value MP2_V1 from the information of the management processor MP2 not matching the previously stored value MP2_Stored for the management processor MP2, the MP1 HWRoT 112 produces (at 216) an MP2 tampered indication that indicates that the management processor MP2 has been compromised.

If the MP1 HWRoT 112 determines (at 204) that the information of the management processor MP1 has not been tampered with (i.e., the management processor MP1 is valid), and the MP1 HWRoT 112 determines (at 212) that the information of the management processor MP2 has not been tampered with, the MP1 HWRoT 112 can de-assert (at 218) the reset signal R2, to release the MP2 HWRoT 114 from reset.

In other examples in which the MP1 HWRoT 112 does not measure the information of the management processor MP2, the MP1 HWRoT 112 can de-assert (at 218) the reset signal R2 based on determining (at 204) that the information of the management processor MP1 has not been tampered with.

Once released from reset, the MP2 HWRoT 114 measures (at 220) information of the management processor MP2, as part of self-validation by the MP2 HWRoT 114. The MP2 HWRoT 114 can read the MP2 firmware 124 and the MP2 subsystem information 134 from the memory 144, and the MP2 HWRoT 114 applies a function (e.g., a cryptographic hash function) to the information of the management processor MP2 to generate a value MP2_V2 (e.g., a hash value) based on the information of the management processor MP2. The MP2 HWRoT 114 determines (at 222) whether the information of the management processor MP2 has been tampered with based on the generated value MP2_V2 produced by the MP2 HWRoT 114. In an example, the MP2 HWRoT 114 can compare the generated value MP2_V2 to the previously stored value MP2_Stored. If the generated value MP2_V2 matches the previously stored value MP2_Stored, then the MP2 HWRoT 114 produces (at 224) an MP2 validated indication to indicate that the management processor MP2 has been validated.

However, if the generated value MP2_V2 does not match the previously stored value MP2_Stored, then that indicates the management processor MP2 has been tampered with, and the MP2 HWRoT 114 produces (at 226) an MP2 tampered indication.

In some examples, the MP2 HWRoT 114 may further measure (at 228) the information of the management processor MP3 (including the MP3 firmware 126 and the MP3 subsystem information 136) to validate the information of the management processor MP3. The validation of the information of the management processor MP3 can be based on comparing a value MP3_V1 generated from the information of the management processor MP3 to a previously stored value MP3_Stored for the management processor MP3. The previously stored value MP3_Stored may have been generated by applying the function to a known good copy of the MP3 firmware 126 and the MP3 subsystem information 136.

If the MP2 HWRoT 114 determines (at 230) that the information of the management processor MP3 has not been tampered based on the generated value MP3_V1 from the information of the management processor MP3 matching the previously stored value MP3_Stored, the MP2 HWRoT 114 produces (at 232) an MP3 validated indication that indicates that the management processor MP3 has not been compromised. However, if the MP2 HWRoT 114 determines (at 230) that the information of the management processor MP3 has been tampered with based on the generated value MP3_V1 from the information of the management processor MP3 not matching the previously stored value MP3_Stored for the management processor MP3, the MP2 HWRoT 114 produces (at 234) an MP3 tampered indication that indicates that the management processor MP3 has been compromised.

If the MP2 HWRoT 114 determines (at 222) that the information of the management processor MP2 has not been tampered with, and the MP2 HWRoT 114 determines (at 230) that the information of the management processor MP3 has not been tampered with, the MP2 HWRoT 114 can de-assert (at 236) the reset signal R3, to release the MP3 HWRoT 116 from reset.

In other examples in which the MP2 HWRoT 114 does not measure the information of the management processor MP3, the MP2 HWRoT 114 can de-assert (at 236) the reset signal R3 based on determining (at 222) that the information of the management processor MP2 has not been tampered with.

Once released from reset, the MP3 HWRoT 116 measures (at 238) information of the management processor MP3, as part of self-validation by the MP3 HWRoT 116. The MP3 HWRoT 116 can read the MP3 firmware 126 and the MP3 subsystem information 136 from the memory 146, and the MP3 HWRoT 116 applies a function (e.g., a cryptographic hash function) to the information of the management processor MP3 to generate a value MP3_V2 (e.g., a hash value) based on the information of the management processor MP3. The MP3 HWRoT 116 determines (at 240) whether the information of the management processor MP3 has been tampered with based on the generated value MP3_V2 produced by the MP3 HWRoT 116. In an example, the MP3 HWRoT 116 can compare the generated value MP3_V2 to the previously stored value MP3_Stored. If the generated value MP3_V2 matches the previously stored value MP3_Stored, then the MP3 HWRoT 116 produces (at 242) an MP3 validated indication to indicate that the management processor MP3 has been validated.

However, if the generated value MP3_V2 does not match the previously stored value MP3_Stored, then that indicates the management processor MP3 has been tampered with, and the MP3 HWRoT 116 produces (at 244) an MP3 tampered indication.

In some examples, as part of the inter-mutual validation, the MP3 HWRoT 116 also measures (at 246) the information of the management processor MP2. The MP3 HWRoT 116 can generate (at 248) an MP2 indication (either an MP2 validated indication or an MP2 tampered indication) based on a value derived from the measurement of the information of the management processor MP2. Similarly, the MP3 HWRoT 116 can measure (at 250) the information of the management processor MP1. The MP3 HWRoT 116 can generate (at 252) an MP1 indication (either an MP1 validated indication or an MP1 tampered indication) based on a value derived from the measurement of the information of the management processor MP1.

As part of the inter-mutual validation, the MP2 HWRoT 114 can measure (at 254) the information of the management processor MP1. The MP2 HWRoT 114 can generate (at 256) an MP1 indication (either an MP1 validated indication or an MP1 tampered indication) based on a value derived from the measurement of the information of the management processor MP1. Also, the MP1 HWRoT 112 can measure (at 258) the information of the management processor MP3. The MP1 HWRoT 112 can generate (at 260) an MP3 indication (either an MP3 validated indication or an MP3 tampered indication) based on a value derived from the measurement of the information of the management processor MP3.

In some examples, the initial measurement of a firmware by a HWRoT can be a measurement of a sub-segment of the firmware (a portion less than the entirety of the firmware). The sub-segment (e.g., a boot block) of the firmware may be stored in a programmable read only memory such as an erasable and programmable read-only memory (EPROM) or an electrically erasable and programmable read-only memory (EEPROM). For example, the MP1 HWRoT 112 may initially measure a boot block of the MP1 firmware 122 stored in a programmable read only memory, the MP2 HWRoT 114 may initially measure a boot block of the MP2 firmware 124 stored in a programmable read only memory, and the MP3 HWRoT 116 may initially measure a boot block of the MP3 firmware 126 stored in a programmable read only memory. Following successful validation of the boot block of a firmware in a subsystem, a HWRoT can validate remaining sub-segments of the firmware as part of a boot process of the subsystem.

The inter-mutual validation performed by a HWRoT of another subsystem may include an initial inter-mutual validation and a full inter-mutual validation. The initial inter-mutual validation may include any or some combination of the following: the MP1 HWRoT 112 validating a sub-segment of the MP2 firmware 124 and/or a sub-segment of the MP3 firmware 126, the MP2 HWRoT 114 validating a sub-segment of the MP1 firmware 122 and/or a sub-segment of the MP3 firmware 126, and the MP3 HWRoT 116 validating a sub-segment of the MP1 firmware 122 and/or a sub-segment of the MP2 firmware 124. These sub-segments of the firmware may be retrieved from respective programmable read only memories and validated.

After the initial inter-mutual validation and after the management processor MP1, the management processor MP2, and the management processor MP3 have completed their boot processes, each of the management processor MP1, the management processor MP2, and the management processor MP3 can provide an indication of boot completion. For example, the management processor MP1 can provide an indication of boot completion to the MP2 HWRoT 114 and/or the MP3 HWRoT 116, the management processor MP2 can provide an indication of boot completion to the MP1 HWRoT 112 and/or the MP3 HWRoT 116, and the MP3 HWRoT 116 an provide an indication of boot completion to the MP2 HWRoT 114 and/or the MP3 HWRoT 116. When a boot process is complete in a subsystem, the firmware of the subsystem is loaded into a main memory (e.g., a DRAM or an SRAM) of the subsystem. The main memory of the subsystem is distinct and separate from the programmable read only memory of the subsystem.

In response to an indication of boot completion from a subsystem, a HWRoT can proceed to measure the firmware of the subsystem that has been retrieved into the main memory of the subsystem, as part of the full inter-mutual validation. The full inter-mutual validation can include any or some combination of the following: the MP1 HWRoT 112 validating the MP2 firmware 124 in the main memory of the management processor MP2 and/or the MP3 firmware 126 in the main memory of the management processor MP3, the MP2 HWRoT 114 validating the MP1 firmware 122 in the main memory of the management processor MP1 and/or the MP3 firmware 126 in the main memory of the management processor MP3, and the MP3 HWRoT 116 validating the MP1 firmware 122 in the main memory of the management processor MP1 and/or the MP2 firmware 124 in the main memory of the management processor MP2. Based on the full inter-mutual validation, the MP1 HWRoT 112, the MP2 HWRoT 114, and the MP3 HWRoT 116 can produce respective indications of whether the full firmware of a subsystem has been tampered with.

The MP1 HWRoT 112 provides (at 262) the validation result 162 to the ballot engine 108. The MP1-provided validation result 162 can include indications of whether one or more of the management processor MP1, management processor MP2, and management processor MP3 have been tampered with, based on validations discussed above. Similarly, the MP2 HWRoT 114 provides (at 264) the validation result 164 to the ballot engine 108. The MP2-provided validation result 164 can include indications of whether one or more of the management processor MP1, management processor MP2, and management processor MP3 have been tampered with, based on validations discussed above. The MP3 HWRoT 116 provides (at 266) the validation result 166 to the ballot engine 108. The MP3-provided validation result 166 can include indications of whether one or more of the management processor MP1, management processor MP2, and management processor MP3 have been tampered with, based on validations discussed above.

The ballot engine 108 can evaluate (at 268) based on the validation results 162, 164, and 166 whether any of the management processor MP1, management processor MP2, and management processor MP3 cannot be trusted. Note that different HWRoTs may provide inconsistent validation results. For example, the MP2 HWRoT 114 may indicate in its validation result 164 that the management processor MP2 can be trusted, but the MP1 HWRoT 112 or the MP3 HWRoT 116 may indicate in its validation result 162 or 166 that the management processor MP2 has been tampered with and cannot be trusted. If inconsistent validation results are received, the ballot engine 108 can apply a policy relating to evaluation of inconsistent results to reconcile the inconsistent validation results. In some examples, the policy can specify that different weights may be associated with the validation results 162, 164, and 166. For example, the validation result 162 from the MP1 HWRoT 112 may have a higher weight than either the validation result 164 from the MP2 HWRoT 114 or the validation result 166 from the MP3 HWRoT 116. As another example, the validation result 164 from the MP2 HWRoT 114 may have a higher weight than the validation result 166 from the MP3 HWRoT 116, and a lower weight than the validation result 162 from the MP1 HWRoT 112.

If the ballot engine 108 receives inconsistent validation results pertaining to a particular subsystem (e.g., the management processor MP2), the ballot engine 108 will evaluate the inconsistent validation results in view of the different assigned weights, and can disregard the validation result with the lower weight. For example, if the MP3 HWRoT 116 indicates in the validation result 166 that the management processor MP2 is not trusted, but the MP2 HWRoT 114 indicates in the validation result 164 that the management processor MP2 is trusted, then the ballot engine 108 can make a determination that the management processor MP2 is trusted if the validation result 164 is assigned a greater weight than the validation result 166.

The different weights assigned to validation results of different HWRoTs can be according to confidence levels associated with the HWRoTs based on historical information indicating vulnerabilities of the HWRoTs. A HWRoT that has historically experienced vulnerability will be given a lower weight. In other examples, confidence levels of HWRoTs can be based on designs of the HWRoTs or based on whether third-party or independent reviews have been performed on the HWRoTs. In an example, a HWRoT whose design has been subjected to third-party or independent review may be assigned a greater weight.

In other examples, a HWRoT design that has a more robust protection against attacks may be assigned a greater weight. Different HWRoTs may be implemented with different technologies. For example, some HWRoTs may be protected using cryptographic key protection mechanisms while other HWRoTs are not so protected. In other examples, some HWRoTs may have open-source designs, while other HWRoTs have proprietary designs.

In further examples, if there are an odd quantity of HWRoTs (such as in the example of FIG. 1 including the MP1 HWRoT 112, the MP2 HWRoT 114, and the MP3 HWRoT 116), the policy relating to evaluation of inconsistent results can be a majority vote policy, in which the ballot engine 108 applies a majority vote determination based on the validation results 162, 164, and 166. If a majority of HWRoTs indicate that a particular subsystem is trusted, then the ballot engine 108 would indicate that the subsystem is trusted even though one or more of the HWRoTs have indicated that the subsystem has been tampered with.

Based on the evaluation (at 268) performed by the ballot engine 108, the ballot engine 108 produces (at 270) system validation information 170, which indicates whether each of the management processors MP1, MP2, and MP3 is trusted. In some examples, a system reset of the computing system 100 (e.g., due to a reboot or a power cycle) can clear any stored values of the ballot engine 108, where the stored values may be based on one or more of the validation results 162, 164, and 166. Clearing stored values of the ballot engine 108 ensures that the ballot engine 108 would re-evaluate information from the HWRoTs 112, 114, and 116. The system reset would also cause the HWRoTs 112, 114, and 116 to validate information of the management processors MP1, MP2, and MP3.

The system validation information 170 may be sent to a remediation engine 180, which may be part of the computing system 100 or outside the computing system 100. The remediation engine 180 may perform one or more remediation actions in response to the system validation information 170 indicating that one or more subsystems of the computing system 100 have been tampered with. Remediation actions can include any or some combination of the following: send an alert to a remote entity, such as an administrator, a program, or a machine, to notify of the tampering; shut down or disconnect network connectivity to the subsystem that has been tampered with; shutting down or disabling network connectivity of the computing system 100; or any other action to address a subsystem that cannot be trusted.

In some examples, in addition to or instead of evaluations by the ballot engine 108, a HWRoT can also trigger a remediation action, such as by sending a validation result (e.g., 162, 164, or 166) to the remediation engine 180. If a HWRoT discovers an issue with a subsystem associated with the HWRoT or another subsystem, the HWRoT can cause the remediation engine 180 to take a remediation action. Allowing one or more of the HWRoTs 112, 114, and 116 to trigger a remediation action reduces the likelihood of the ballot engine 108 itself being a single point of attack.

Without inter-mutual validation according to some examples of the present disclosure, a compromised HWRoT may report that an associated subsystem can be trusted, even though the compromised HWRoT may allow the tampered subsystem to continue operation. The inter-mutual validation allows other HWRoTs to cross-check subsystems to increase the likelihood that a tampered subsystem can be detected.

Figure 3:
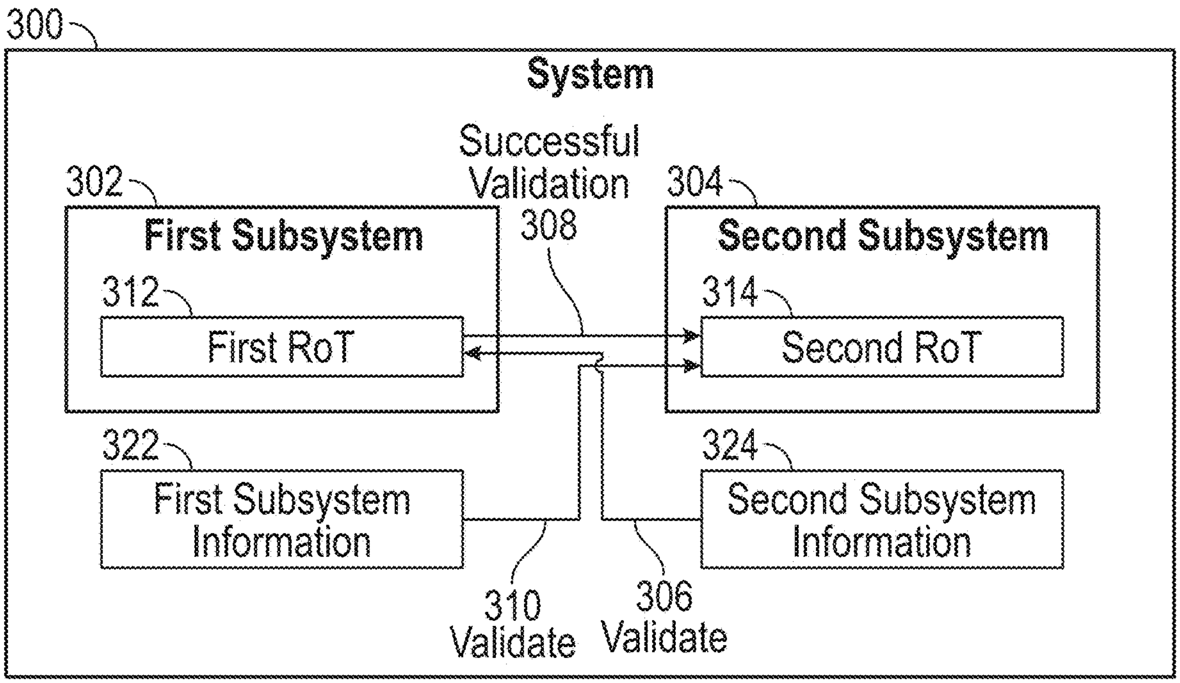
FIG. 3 is a block diagram of a system according to some examples.

FIG. 3 is a block diagram of a system 300 according to some examples of the present disclosure. The system 300 can be implemented with a computer or multiple computers. The system 300 includes a plurality of subsystems 302 and 304 associated with respective RoTs 312 and 314. For example, a first RoT 312 may part of a first subsystem 302, and a second RoT 314 may part of a second subsystem 304. The RoTs 312 and 314 may include HWRoTs.

The first RoT 312 validates information 322 of the first subsystem 302, and the second RoT 314 validates information 324 of the second subsystem 316. The information 322 of the first subsystem 302 may be stored in a memory outside the first subsystem 302, and the information 324 of the second subsystem 304 may be stored in a memory outside the second subsystem 304, for example. In further examples, a portion of the information 322 of the first subsystem 302 may be stored in a memory inside the first subsystem 302, and a portion of the information 324 of the second subsystem 304 may be stored in a memory inside the second subsystem 304. The plurality RoTs further perform inter-mutual validation, where the inter-mutual validation includes the first RoT 312 validating (at 306) the information 324 of the second subsystem 304. Based on the first RoT 312 validating the second subsystem 304, the first RoT 312 provides (at 308) an indication of successful validation of the second subsystem 304. Based on the indication of successful validation, the second RoT 314 validates (at 310) the information of the first subsystem 302.

In some examples, the plurality of RoTs further include a third RoT to validate information of a third subsystem of the plurality of subsystems. The inter-mutual validation further includes the second RoT 314 validating the information of the third subsystem. Based on the second RoT 314 validating the third subsystem, the second RoT 314 providing an indication of successful validation of the third subsystem. Based on the indication of successful validation of the third subsystem, the third RoT validates the information 324 of the second subsystem 304.

In some examples, the inter-mutual validation further includes the third RoT validating the information 322 of the first subsystem 302, and the first RoT 312 validating the information of the third subsystem.

In some examples, the indication of successful validation of the second subsystem 304 includes releasing the second RoT 314 from reset, such as by de-asserting a reset signal to the second RoT 314. The second RoT 314 validates the information 322 of the first subsystem 302 responsive to the release of the second RoT 314 from reset.

In some examples, the plurality of subsystems include multiple subsystems selected from among a management controller, a security processor, a host subsystem including a host CPU (e.g., 110 in FIG. 1), a NIC, a power manager, or an enclosure manager.

In some examples, the providing of the indication of successful validation is further based on successful validation of the information 322 of the first subsystem 302 by the first RoT 312.

In some examples, the information 322 of the first subsystem 302 includes machine-readable instructions (e.g., firmware and/or software) and subsystem information of the first subsystem 302. Similarly, the information 324 of the second subsystem 304 includes machine-readable instructions and subsystem information of the second subsystem 304.

In some examples, the first RoT generates a root of trust tamper indication responsive to failing to validate the information 322 of the first subsystem 302 or the information 324 of the second subsystem 304. The second RoT generates a root of trust tamper indication responsive to failing to validate the information 324 of the second subsystem 304 or the information 322 of the first subsystem 302.

In some examples, a first memory associated with the first subsystem 302 stores the information 322 of the first subsystem 302, and a second memory associated with the second subsystem 304 stores the information 324 of the second subsystem 304. The first RoT 312 accesses the information 324 of the second subsystem 304 in the second memory over a shared communication path (e.g., 152 in FIG. 1), and the second RoT 314 accesses the information 322 of the first subsystem 302 in the first memory over the shared communication path.

In some examples, a controller (such as the ballot engine 108 of FIG. 1) receives, from the first subsystem 302, a first result of a validation of the information 322 of the first subsystem 302 by the first RoT 312, receives, from the second subsystem 304, a second result of a validation of the information 322 of the first subsystem 302 by the second RoT 314, receives, from the second subsystem 304, a third result of a validation of the information 324 of the second subsystem 304 by the second RoT 314, and receives, from the first subsystem 302, a fourth result of a validation of the information 324 of the second subsystem 304 by the first RoT 312. The controller determines, based on the first, second, third, and fourth results, whether the first subsystem or the second subsystem has been compromised, such as based on subsystem tamper indications or subsystem validated indications provided by the RoTs and included in the validation results.

In some examples, the first result of the validation of the information 322 of the first subsystem 302 by the first RoT 312 is inconsistent with the second result of the validation of the information 322 of the first subsystem 302 by the second RoT 314. The controller determines whether the first subsystem is compromised according to a policy relating to evaluation of inconsistent results.

In some examples, the policy can specify that different weights may be associated with the validation results. The controller can assign a first weight to the first result of validation of the information 322 of the first subsystem 302 by the first RoT 312, and assign a second weight to the second result of validation of the information 322 of the first subsystem 302 by the second RoT 314, where the first weight is different from the second weight. The controller determines whether the first subsystem is compromised according to the first weight and the second weight.

In some examples, the policy relating to evaluation of inconsistent results can be a majority vote policy, in which the controller applies a majority vote determination based on the validation results. The controller can receive, from a third RoT, a fifth result of a validation of the information 322 of the first subsystem 302 by the third RoT. The controller determines whether the first subsystem is compromised according to the majority vote determination in which the controller determines whether there are more indications that the first subsystem is compromised than indications that the first subsystem has not been compromised.

In some examples, a reset of the system 300 causes a reset of the controller to clear values of the controller that causes the controller to reevaluate validity of the first and second subsystems 302 and 304. The reset of the system 300 also causes the first RoT 312 and the second RoT 314 to re-validate the information of the first subsystem and the second subsystem.

Figure 4:
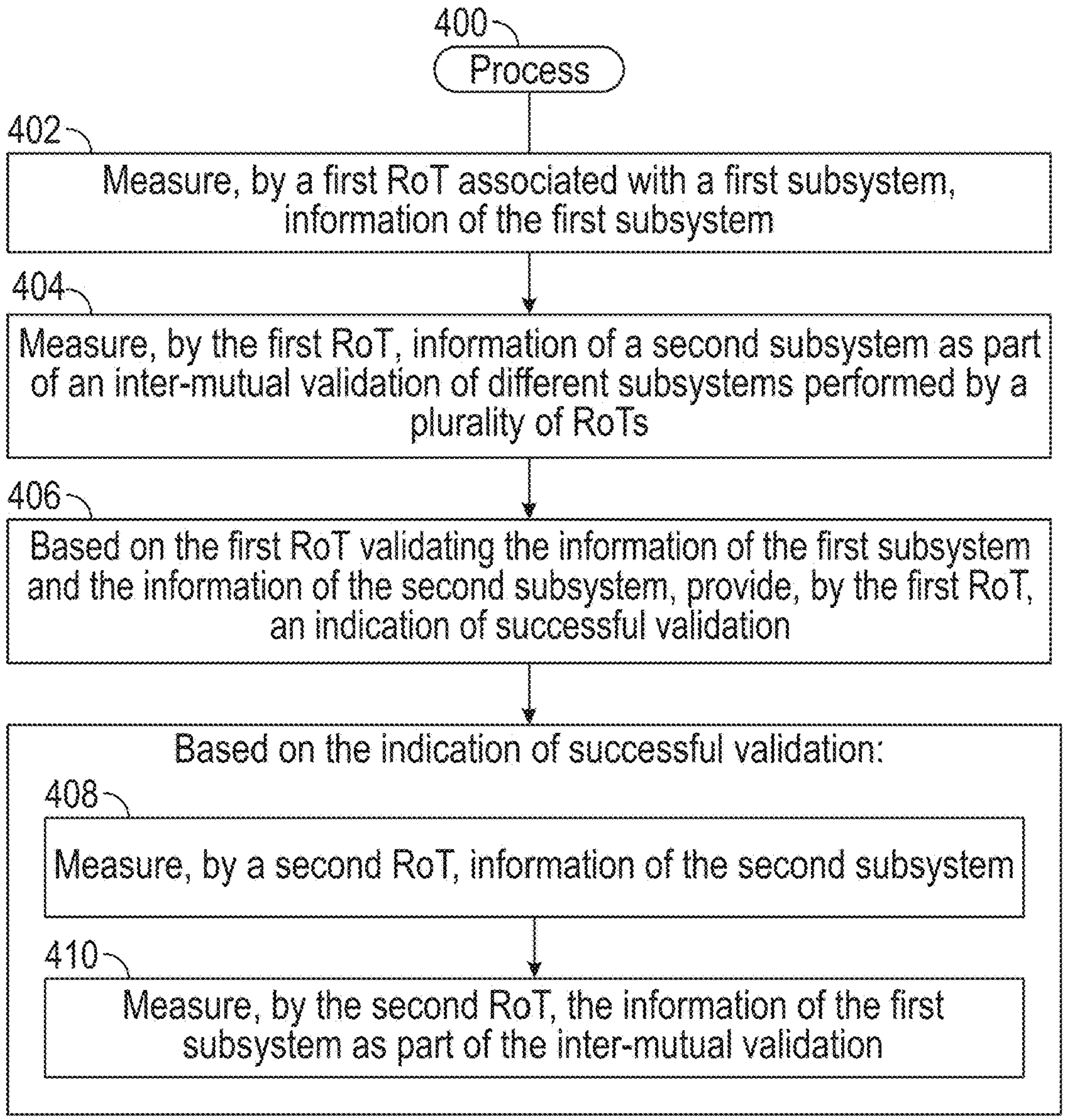
FIG. 4 is a flow diagram of a process according to some examples.

FIG. 4 is a flow diagram of a process 400 according to some examples. The process 400 includes measuring (at 402), by a first RoT associated with a first subsystem, information of the first subsystem, and measuring (at 404), by the first RoT, information of a second subsystem as part of an inter-mutual validation of different subsystems performed by a plurality of RoTs. Measuring information of a subsystem can refer to computing a value (e.g., a hash value) by applying a function (e.g., a hash function) to the information.

Based on the first RoT validating the information of the first subsystem and the information of the second subsystem, the process 400 includes providing (at 406), by the first RoT, an indication of successful validation. The indication of successful validation indicates that neither the first subsystem nor the second subsystem has been tampered with.

Based on the indication of successful validation, the process 400 includes measuring (at 408), by a second RoT of the plurality of RoTs, information of the second subsystem, and measuring (at 410), by the second RoT, the information of the first subsystem as part of the inter-mutual validation. The second RoT is associated with the second subsystem.

In some examples, the indication of successful validation includes de-asserting a reset signal to the second RoT that releases the second RoT from reset.

Figure 5:
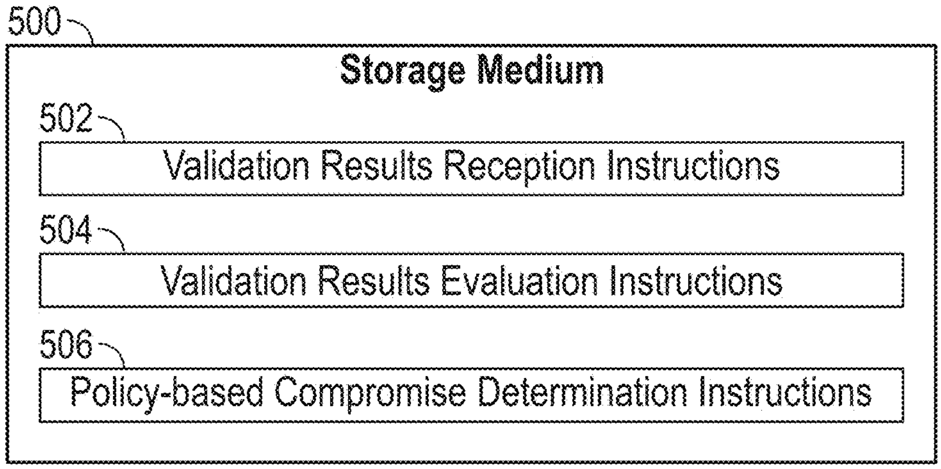
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a controller (e.g., the ballot engine 108 of FIG. 1) to perform various tasks.

The machine-readable instructions include validation results reception instructions 502 to receive, at the controller, validation results of a first subsystem provided by a plurality of RoTs associated with respective different subsystems. The validation results are produced by an inter-mutual validation of the different subsystems performed by the plurality of RoTs.

The machine-readable instructions include validation results evaluation instructions 504 to evaluate the validation results that include inconsistent indications of validity of the first subsystem provided by the plurality of RoTs. For example, the inconsistent indications of validity can include an indication provided by a first RoT that the first subsystem is compromised, and an indication provided by a second RoT that the first subsystem is not compromised.

The machine-readable instructions include policy-based compromise determination instructions 506 to determine, according to a policy relating to evaluation of inconsistent results, whether the first subsystem is compromised based on the validation results. The policy can specify that different weights may be associated with the validation results, or the policy can be a majority vote policy.

A "BMC" can refer to a specialized service controller that monitors the physical state of a computing system using sensors and communicates with a remote management system (that is remote from the electronic device) through an independent "out-of-band" connection. The BMC can perform management tasks to manage components of the computing system. Examples of management tasks that can be performed by the BMC can include any or some combination of the following: power control to perform power management of the computing system (such as to transition the computing system between different power consumption states in response to detected events), thermal monitoring and control of the computing system (such as to monitor temperatures of the computing system and to control thermal management states of the computing system), fan control of fans in the computing system, system health monitoring based on monitoring measurement data from various sensors of the computing system, remote access of the computing system (to access the computing system over a network, for example), remote reboot of the computing system (to trigger the computing system to reboot using a remote command), system setup and deployment of the computing system, system security to implement security procedures in the computing system, and so forth.

In some examples, the BMC can provide so-called "lights-out" functionality for a computing system. The lights out functionality may allow a user, such as a systems administrator, to perform management operations on the computing system even if an OS is not installed or not functional on the computing system.

Moreover, in some examples, the BMC can run on auxiliary power provided by an auxiliary power supply (e.g., a battery); as a result, the computing system does not have to be powered on to allow the BMC to perform the BMC's operations. The auxiliary power supply is separate from a main power supply that supplies powers to other components (e.g., a main processor, a memory, an input/output (I/O) device, etc.) of the computing system.

A storage medium (e.g., 500 in FIG. 5) can include any or some combination of the following: a semiconductor memory device such as a DRAM or SRAM, an EPROM, an EEPROM, and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:

a plurality of subsystems associated with respective root of trusts (RoTs), the RoTs comprising a first RoT to validate information of a first subsystem of the plurality of subsystems based on applying a function to the information of the first subsystem, and a second RoT to validate information of a second subsystem of the plurality of subsystems, the RoTs further to perform inter-mutual validation, the inter-mutual validation comprising:

the first RoT validating the information of the second subsystem, based on the first RoT validating the information of the second subsystem, providing, by the first RoT, an indication of successful validation of the second subsystem, and based on the indication, the second RoT validating the information of the first subsystem based on applying, by the second RoT, the function to the information of the first subsystem; and a controller to:

receive, from the first subsystem, a first validation result produced by the validating of the information of the first subsystem by the first RoT, the first validation result indicating that the first subsystem is trusted, receive, from the second subsystem, a second validation result produced by the validating of the information of the first subsystem by the second RoT, the second validation result indicating that the first subsystem is untrusted, and determine, based on the first and second validation results according to a policy relating to evaluation of inconsistent results, whether the first subsystem has been compromised.

2. The system of claim 1, wherein the RoTs further comprise a third RoT to validate information of a third subsystem of the plurality of subsystems, and the inter-mutual validation further comprising:

the second RoT validating the information of the third subsystem, based on the second RoT validating the information of the third subsystem, the second RoT providing an indication of successful validation of the third subsystem, and based on the indication of successful validation of the third subsystem, the third RoT validating the information of the second subsystem.

3. The system of claim 1, wherein the function is a cryptographic hash function.

4. The system of claim 1, wherein the indication of successful validation of the second subsystem comprises releasing the second RoT from reset, wherein the second ROT validating the information of the first subsystem is responsive to the release of the second RoT from reset.

5. The system of claim 4, wherein the releasing of the second RoT from reset is part of an RoT release sequence in which successive RoTs are released one after another.

6. The system of claim 1, wherein the plurality of subsystems comprises multiple subsystems selected from among a management controller, a security processor, a host subsystem comprising a host central processing unit (CPU), a network interface controller, a power manager, or an enclosure manager.

7. The system of claim 1, wherein the providing of the indication of successful validation is further based on successful validation of the information of the first subsystem by the first RoT.

8. The system of claim 1, wherein the information of the first subsystem comprises machine-readable instructions and subsystem information of the first subsystem, and the information of the second subsystem comprises machine-readable instructions and subsystem information of the second subsystem.

9. The system of claim 1, wherein the first RoT is to generate a root of trust tamper indication responsive to failing to validate the information of the first subsystem or the information of the second subsystem, and the second RoT is to generate a root of trust tamper indication responsive to failing to validate the information of the second subsystem or the information of the first subsystem.

10. The system of claim 1, comprising:

a first memory to store the information of the first subsystem; and a second memory to store the information of the second subsystem, wherein the first RoT is to access the information of the second subsystem in the second memory over a shared communication path, and the second RoT is to access the information of the first subsystem in the first memory over the shared communication path.

11. The system of claim 1, wherein the validating of the information of the second subsystem by the first RoT comprises the first RoT applying the function to the information of the second subsystem to generate a value, and comparing the generated value to a previously stored value.

12. The system of claim 1, wherein the RoTs further comprise a third RoT to validate the information of the first subsystem, the controller to further:

receive, from a third subsystem, a third validation result produced by the validating of the information of the first subsystem by the third RoT, wherein the determining of whether the first subsystem has been compromised is based on the controller applying a majority vote determination based on the first, second, and third validation results.

13. The system of claim 1, wherein the controller is to:

assign a first weight to the first validation result, and assign a second weight to the second validation result, the first weight being different from the second weight, and determine whether the first subsystem has been compromised according to the first weight and the second weight.

14. The system of claim 1, wherein a reset of the system causes:

a reset of the controller to clear values of the controller, wherein the controller is to reevaluate validity of the first and second subsystems in response to the cleared values, and the first RoT and the second RoT to re-validate the information of the first subsystem and the second subsystem.

15. A method comprising:

measuring, by a first root of trust (RoT) associated with a first subsystem, information of the first subsystem based on applying a function to the information of the first subsystem;

measuring, by the first RoT, information of a second subsystem as part of an inter-mutual validation of different subsystems performed by a plurality of RoTs;

based on the first RoT validating the information of the first subsystem and the information of the second subsystem, providing, by the first RoT, an indication of successful validation; and based on the indication of successful validation:

measuring, by a second RoT of the plurality of RoTs, information of the second subsystem, the second RoT associated with the second subsystem, and measuring, by the second RoT, the information of the first subsystem as part of the inter-mutual validation based on applying, by the second RoT, the function to the information of the first subsystem; and receiving, at a controller, from the first subsystem, a first validation result produced by the measuring of the information of the first subsystem by the first RoT, the first validation result indicating that the first subsystem is trusted;

receiving, at the controller, from the second subsystem, a second validation result produced by the measuring of the information of the first subsystem by the second RoT, the second validation result indicating that the first subsystem is untrusted; and determining, by the controller, based on the first and second validation results, according to a policy relating to evaluation of inconsistent results, whether the first subsystem has been compromised.

16. The method of claim 15, wherein the indication of successful validation comprises de-asserting a reset signal to the second RoT that releases the second RoT from reset.

17. The method of claim 15, further comprising:

receiving, at the controller from a third subsystem, a third validation result produced by a third RoT of the third subsystem based on measuring the information of the first subsystem by the third RoT, wherein the determining of whether the first subsystem has been compromised is based on the controller applying a majority vote determination based on the first, second, and third validation results.

18. The method of claim 15, comprising:

assigning, by the controller, a first weight to the first validation result, and a second weight to the second validation result, the first weight being different from the second weight, wherein the determining of whether the first subsystem has been compromised is according to the first weight and the second weight.

19. A non-transitory machine-readable storage medium comprising instructions that upon execution cause a controller to:

receive, at the controller, validation results of a first subsystem provided by a plurality of root of trusts (RoTs) associated with respective different subsystems, the different subsystems comprising the first subsystem, the validation results produced by an inter-mutual validation of the different subsystems performed by the plurality of RoTs, the validation results comprising a first validation result produced by a first RoT applying a function to information of the first subsystem, and a second validation result produced by a second RoT applying the function to the information of the first subsystem, the first validation result indicating that the first subsystem is trusted, and the second validation result indicating that the first subsystem is untrusted;

evaluate the validation results that include inconsistent indications of validity of the first subsystem provided by the plurality of RoTs; and determine, according to a policy relating to evaluation of inconsistent results, whether the first subsystem is compromised based on the validation results.

20. The non-transitory machine-readable storage medium of claim 19, wherein:

the policy specifies that different weights are assigned to the validation results provided by different RoTs of the plurality of RoTs.

* * * * *